United States Patent [19]
Jones

[11] Patent Number: 5,445,524
[45] Date of Patent: Aug. 29, 1995

[54] GEOGRAPHIC LOCATION IDENTIFICATION SYSTEM

[76] Inventor: John A. Jones, P.O. Box 144, Alvin, Tex. 77512

[21] Appl. No.: 238,012

[22] Filed: May 3, 1994

[51] Int. Cl.$^6$ .............................................. G09B 29/10
[52] U.S. Cl. ................................... 434/153; 434/150; 293/34
[58] Field of Search ............... 434/153, 150, 130, 217; 283/34, 35

[56] References Cited

U.S. PATENT DOCUMENTS

| | | | |
|---|---|---|---|
| 4,402,672 | 9/1983 | Lowe, Jr. .............................. | 434/217 |
| 5,030,117 | 7/1991 | Delorme .............................. | 434/130 |

FOREIGN PATENT DOCUMENTS

| | | | |
|---|---|---|---|
| 405027678 | 2/1993 | Japan .................................. | 434/150 |
| 405027679 | 2/1993 | Japan .................................. | 434/150 |
| 2236610 | 4/1991 | United Kingdom ................ | 434/150 |

OTHER PUBLICATIONS

Rand McNally's Streetfinder map New Update Edition, 1994.

Primary Examiner—Robert A. Hafer
Assistant Examiner—Michael O'Neill
Attorney, Agent, or Firm—Kenneth A. Roddy

[57] ABSTRACT

A geographical region is circumscribed by a rectangular parallelogram and identified by a letter or numeral prefix. The parallelogram is divided by an equal number of rows and columns into a series of smaller rectangles circumscribing a section of the geographical region and each is assigned a different whole number representing its position relative to the others. Each section is identified by the prefix and its whole number. Each smaller rectangle is divided by the same number of rows and columns into a second series of smaller rectangles circumscribing a subsection of the previous section and each is assigned a different whole number representing its relative location, and each is identified by the prefix and the whole number assigned to the previous section followed by the whole number assigned to the subsection. The steps are repeated to define successively smaller rectangles circumscribing successively smaller subsections of the previous subsection and a whole number is assigned to each successively smaller subsection representing its relative location, and each series of rectangles is identified by the prefix followed by the sequence of whole numbers. Each whole number identifies a particular section of the geographical region and the value of each whole number identifies the location of each section or subsection relative to the others. The order of each whole number in the sequence corresponds to the size of the section identified by the whole number. The first whole number being the largest section and the following whole numbers being sequentially smaller sections.

8 Claims, 3 Drawing Sheets

FIG. 1

GEOGRAPHIC LOCATION IDENTIFICATION SYSTEM

FIELD OF THE INVENTION

This invention relates generally to geographical identification and location systems, and more particularly to a geographic location and identification system wherein a specific location within a geographical region is identified by a character set having an alphabetical or numerical prefix followed by a sequence of whole numbers. Each whole number identifies a particular section of a geographical region and the value of each whole number identifies the location of each particular section relative to the others, and the order of each whole number in the sequence corresponds to the size of the particular section identified by the whole number with the first whole number corresponding to the largest section of the geographical region and the following whole numbers correspond to sequentially smaller sections of the geographical region.

BRIEF DESCRIPTION OF THE PRIOR ART

In many emergency situations, a dispatcher will require a person requesting help to identify the location at which assistance is needed. This is accomplished by the caller giving a street address or the name of a street and the nearest cross street. The dispatcher then relays this information to the appropriate emergency personnel who then look up the address on a map to determine the best route to the emergency scene. Often, however, the person requesting assistance may not be familiar with the area, or the location may be a rural area which does not have a street numbering system and the roads are many miles apart.

The "911" emergency telephone number is an emergency dispatch system wherein a person requesting help calls "911" on the telephone and a computer automatically displays the street address from which the call was made. The dispatcher also asks the caller to identify the location at which assistance is needed to verify if the call was made from the emergency scene. If not, the caller would give a street address or the name of a street and the nearest cross street. The dispatcher then relays this information to the appropriate emergency personnel who then look up the address on a map to determine the best route to the emergency scene. Often, however, there may not be a telephone near the scene of the emergency and the person requesting assistance may be many miles from the scene or unfamiliar with the area. In some rural areas, in may be necessary to direct the emergency personnel to the nearest known location or road intersection and then have them follow someone to the scene of the emergency.

There are several patents which disclose various mapping and locating systems.

Delorme, U.S. Pat. No. 5,030,117 discloses a computerized digital mapping system which comprises a plurality of maps at a plurality of levels above the Earth from a lowest resolution to a highest resolution. Each map comprises a plurality of windows encompassing defined degrees of longitude and latitude according to the respective map level. The windows for each level along the equator have a width-to-height ratio of approximately one which decreases in the direction from the equator to the poles. The first level map comprises four windows with each window encompassing 256° of longitude and latitude. Each successive descending level contains four times tiles or squares as the level above it. There is a hierarchy of at least sixteen map levels including an eleventh level having windows encompassing 15 seconds of latitude and a twelfth level having windows encompassing 7.5 seconds of latitude so that the maps are consistent with conventional mapping scale divisions.

Lowe, Jr., U.S. Pat. No. 4,402,672 discloses a method for plotting and disseminating information on the paths of storms wherein a map is provided with a grid system consisting of generally horizontal and generally parallel angular lines intersecting the generally horizontal lines and corresponding to the angle of the typical path of dangerous storms in a selected region. These lines form intersecting rows and columns dividing the region into subregions. Each row is designated by a letter and each column is designated by a numeral. Each subregion of the map is then identified by the letter and numeral combination. A weather bulletin for an area would include a reference to the row and column designation for the subregion involved.

The present invention is distinguished over the prior art in general, and these patents in particular by an alphanumeric geographic location and identification system wherein a geographical region is circumscribed by a rectangular parallelogram and identified by a letter or numeral prefix. The top, bottom, right, and left sides of the parallelogram intersect the outermost top, bottom, right, and left points, respectively, of the known boundary lines of the geographical region. The parallelogram is divided by an equal number of rows and columns into a series of smaller rectangles circumscribing a section of the geographical region and each is assigned a different whole number representing its position relative to the others. Each section is identified by the prefix and its whole number. Each smaller rectangle is divided by the same number of rows and columns into a second series of smaller rectangles circumscribing a subsection of the previous section and each is assigned a different whole number representing its relative location, and each is identified by the prefix and the whole number assigned to the previous section followed by the whole number assigned to the subsection.

The steps are repeated to define successively smaller rectangles circumscribing successively smaller sub-sections of the previous subsection and a whole number is assigned to each successively smaller subsection representing its relative location, and each series of rectangles is identified by the prefix followed by the sequence of whole numbers. Each whole number identifies a particular section of the geographical region and the value of each whole number identifies the location of each section or subsection relative to the others. The order of each whole number in the sequence corresponds to the size of the section identified by the whole number. The first whole number being the largest section and the following whole numbers being sequentially smaller sections.

SUMMARY OF THE INVENTION

It is therefore an object of the present invention to provide an alphanumeric geographic location and identification system for easily and quickly locating and identifying a particular section of a geographical region which may range in size from several miles square to several feet square.

It is another object of this invention to provide an alphanumeric geographic location and identification system which is particularly useful in locating and identifying particular locations in rural areas which do not have a conventional street numbering system.

Another object of this invention is to provide an alphanumeric geographic location and identification system which is particularly useful in directing emergency medical crews, fireman, policemen, and rescue teams to a precise location in an unfamiliar area or rural area which may or may not have a conventional street numbering system.

Another object of this invention is to provide an alphanumeric geographic location and identification system which is particularly useful in directing delivery and services personel to a precise location thus saving travel time and reducing miles traveled.

Another object of this invention is to provide an alphanumeric geographic location and identification system which can be used in addition to existing street address numbering systems and zip codes for unfamiliar area or rural area which does not have a conventional street numbering system.

Another object of this invention is to provide an alphanumeric geographic location and identification system which is not based on longitude and latitude or polar coordinates.

Another object of this invention is to provide an alphanumeric geographic location and identification numbering system wherein a specific location within a geographical region is identified by a character set having an alphabetical or numerical prefix followed by a sequence of whole numbers.

Another object of this invention is to provide an alphanumeric geographic location and identification numbering system incorporating a character set having an alphabetical or numerical prefix followed by a sequence of whole numbers wherein each whole number identifies a particular section of a geographical region and the value of each whole number identifies the location of each particular section relative to the others, and the order of each whole number in the sequence corresponds to the size of the particular section identified by the whole number with the first whole number corresponding to the largest section of the geographical region and the following whole numbers correspond to sequentially smaller sections of the geographical region.

Another object of this invention is to provide a mapping system wherein a character set having an alphabetical or numerical prefix followed by a sequence of whole numbers identifies a particular map of a section of a geographical region and the value of each whole number identifies the location of each particular section relative to the others, and the order of each whole number in the sequence corresponds to size of the area covered by the particular section map identified by the whole number with the first whole number corresponding to a series of maps depicting the largest section of the geographical region and the following whole numbers correspond to a series of maps depicting sequentially smaller sections of the geographical region.

A further object of this invention is to provide an alphanumeric character set corresponding to a mapping system which may be easily computerized with the character set serving as the filename to store and retrieve a particular map of a section of a geographical region.

A still further object of this invention is to provide an alphanumeric geographic location and identification system which is extremely accurate, logical, easily understood and remembered, and inexpensive to implement.

Other objects of the invention will become apparent from time to time throughout the specification and claims as hereinafter related.

The above noted objects and other objects of the invention are accomplished by an alphanumeric geographic location and identification system wherein a geographical region is circumscribed by a rectangular parallelogram and identified by a letter or numeral prefix. The top, bottom, right, and left sides of the parallelogram intersect the outermost top, bottom, right, and left points, respectively, of the known boundary lines of the geographical region. The parallelogram is divided by an equal number of rows and columns into a series of smaller rectangles circumscribing a section of the geographical region and each is assigned a different whole number representing its position relative to the others. Each section is identified by the prefix and its whole number. Each smaller rectangle is divided by the same number of rows and columns into a second series of smaller rectangles circumscribing a subsection of the previous section and each is assigned a different whole number representing its relative location, and each is identified by the prefix and the whole number assigned to the previous section followed by the whole number assigned to the subsection.

The steps are repeated to define successively smaller rectangles circumscribing successively smaller subsections of the previous subsection and a whole number is assigned to each successively smaller subsection representing its relative location, and each series of rectangles is identified by the prefix followed by the sequence of whole numbers. Each whole number identifies a particular section of the geographical region and the value of each whole number identifies the location of each section or subsection relative to the others. The order of each whole number in the sequence corresponds to the size of the section identified by the whole number. The first whole number being the largest section and the following whole numbers being sequentially smaller sections.

DESCRIPTION OF THE PREFERRED EMBODIMENT

Figure 1:
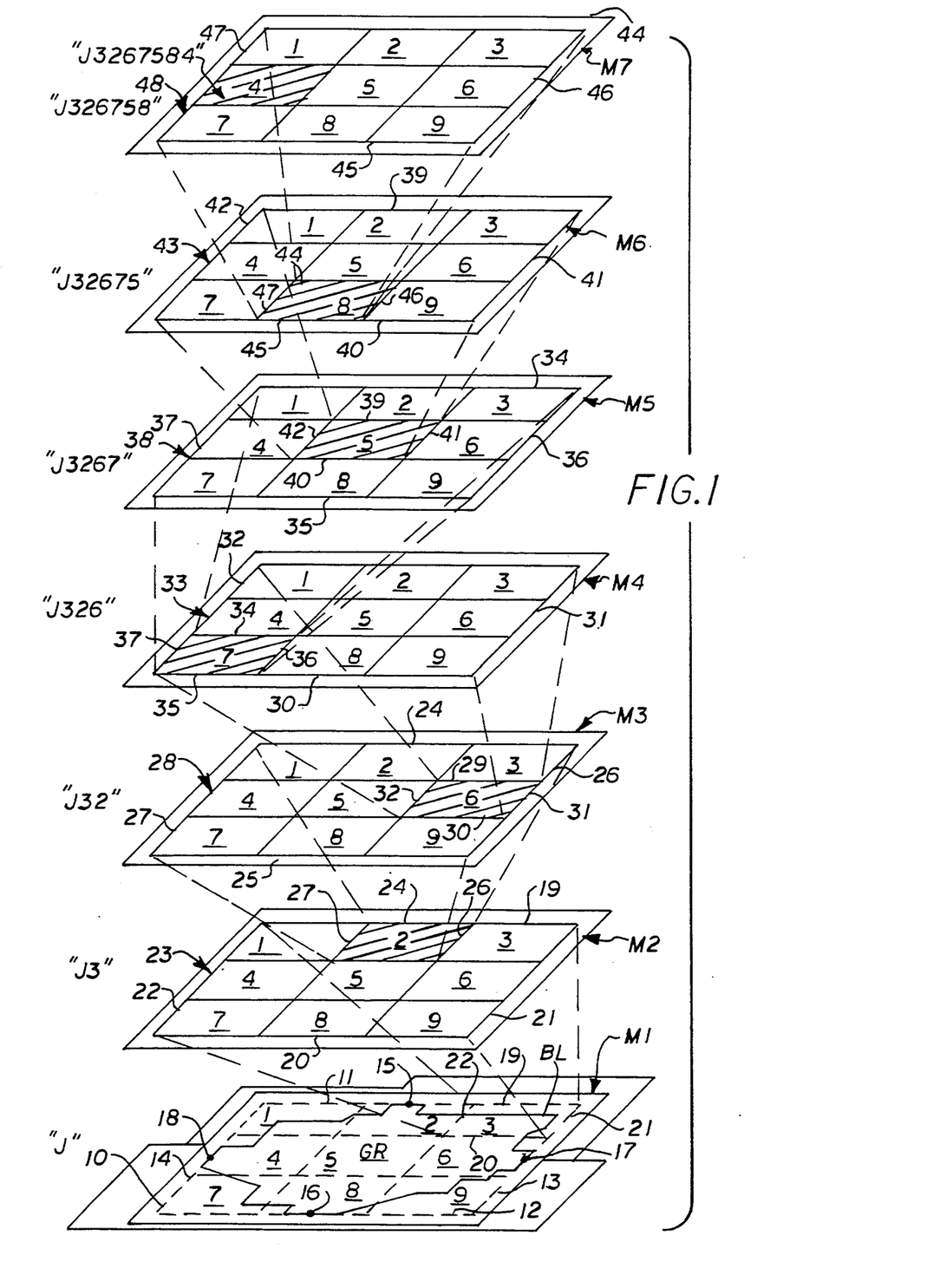
FIG. 1 is an exploded perspective view illustrating schematically the geographic location identification system in accordance with the present invention.
Figure 2:
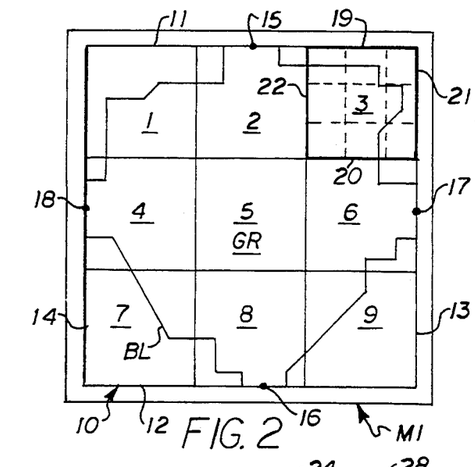
FIGS. 2–8 are plan views illustrating maps incorporating the geographic location identification system.

Referring to the drawings by numerals of reference, there is shown in FIGS. 1 and 2, the outline of a known geographical region GR, such as a county, parish, etc. The outline is defined by the boundary lines BL of the geographical area enclosed thereby, for example, the county lines which separate one county from an adjacent county.

The geographical region GR is circumscribed by a north-south positioned rectangular parallelogram 10 having opposite parallel sides and 90° included angles. The top, bottom, right, and left sides 11, 12, 13, and 14 of the parallelogram 10 intersect the outermost top, bottom, right, and left points 15, 16, 17, and 18, respectively, of the boundary lines BL of the geographical region GR. In a preferred embodiment the starting entity or base geographical region GR which is circumscribed by the parallelogram is identified by a prefix letter. For example, Jackson County may be identified by the prefix "J".

The parallelogram 10 is divided by an equal number of rows and columns to define a series of adjacent rectangular spaces or cells, for example three columns and three rows to define nine rectangular cells, and each individual cell is assigned a whole number from 1–9, respectively. Thus, each of the cells 1–9 represent a particular section of the circumscribed geographical region and the numerals 1–9 represent the relative positions of the cells.

This first parallelogram 10 is the first level of the numerical system and the numeral 1–9 assigned to each cell in the first level parallelogram 10 is the first digit of the numerical system and identifies a particular section of the geographical region GR. For example, the numeral 3 identifies the upper right section of the geographical region GR.

Since most geographical regions are not rectangular and do not have parallel boundary lines, the adjacent geographical regions sharing common boundary lines will have overlapping rectangular sections or cells. Thus, for example, if Smith County is adjacent Jackson County, the section "J3" would be identified as the upper right section of "Jackson County" and would also be identified in the parallelogram circumscribing "Smith County" as the upper left section "S1".

Figure 3:
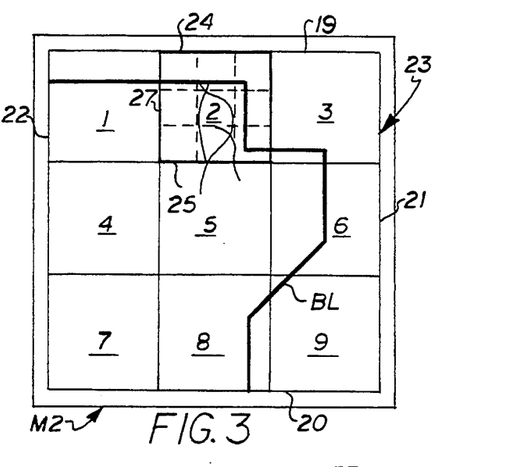

Referring additionally to FIG. 3, the lines which define each of the first level cells 1–9 then become the sides of a series of second level rectangular parallelograms with 90° included angles. For example, the lines 19, 20, 21, and 22 become the opposed parallel sides of the second level rectangular parallelogram 23. The parallelogram 23 is divided by the same number of equal rows and columns as the previous parallelogram to define a series of adjacent cells, for example nine spaces, and each individual space is assigned a numeral 1–9 as before. Thus, each of the cells 1–9 of the second level parallelogram 23 represents a particular section of the previous section and the numerals 1–9 represent the relative positions of the cells. For example, the numeral 2 identifies the top center section of the previous section 3.

Figure 4:
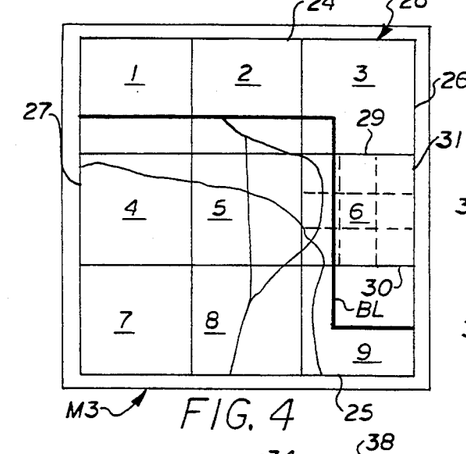

Referring additionally to FIG. 4, the lines which define each of the second level cells 1–9 then become the sides of a series of third level rectangular parallelograms having opposite parallel sides and 90° included angles. For example, the lines 24, 25, 26, and 27 become the opposed parallel sides of the third level parallelogram 28. The third level parallelogram 28 is divided by the same number of rows and columns as the previous parallelogram to define a series of cells, for example nine cells, and each individual cell is assigned a numeral 1–9 as before. Thus, each of the cells 1–9 of the third level parallelogram 28 represents a particular section of the previous section of the previous section and the numerals 1–9 represent the relative positions of the cells. For example, the numeral 6 identifies the right hand center section of the previous top center section number 2 (level 2) of the previous right hand corner section 3 (level 1).

Figure 5:
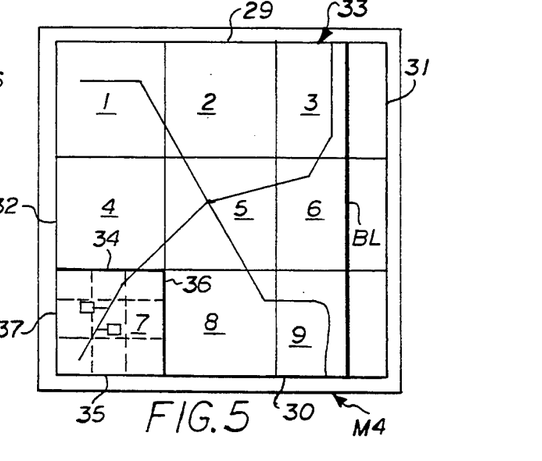

Referring additionally to FIG. 5, the lines which define each of the third level cells 1–9 then become the sides of a fourth level rectangular parallelogram having opposite parallel sides and 90° included angles. For example, the lines 29, 30, 31, and 32 become the opposed parallel sides of the fourth level parallelogram 33. The fourth level parallelogram 33 is divided by the same number of rows and columns as the previous parallelogram to define a series of cells, for example nine cells, and each individual cell is assigned a numeral 1–9 as before. Thus, each of the cells 1–9 of the fourth level parallelogram 33 represents a particular section of the previous section of the previous section of the previous section. For example, the numeral 7 identifies the lower left hand section of the previous right hand center section number 6 (level 3) of the previous top center section number 2 (level 2) of the previous right hand corner section 3 (level 1).

Figure 6:
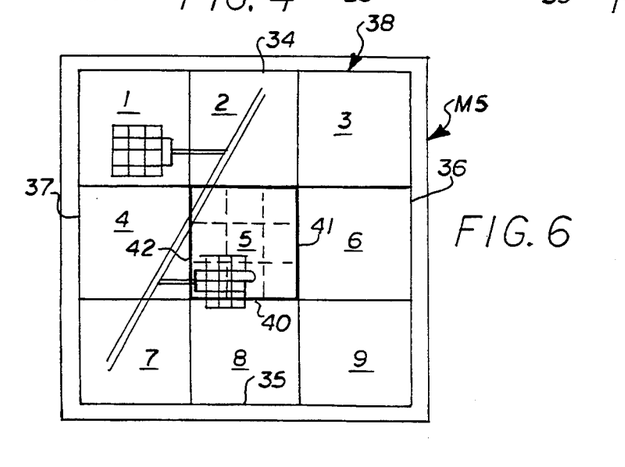

Referring additionally to FIG. 6, the lines which define each of the fourth level cells 1–9 then become the sides of a fifth level rectangular parallelogram having opposite parallel sides and 90° included angles. For example, the line 34, 35, 36, and 37 become the opposed parallel sides of the fifth level parallelogram 38. The fifth level parallelogram 38 is divided by the same number of rows and columns as the previous parallelogram to define a series of cells, for example nine cells, and each individual space is assigned a numeral 1–9 as before. Thus, each of the spaces 1–9 of the fifth level parallelogram 38 represents a particular section of the previous section of the previous section of the previous section of the previous section. For example, the numeral 5 identifies the center section of the previous lower left hand section number 7 (level 4) of the previous right hand center section number 6 (level 3) of the previous top center section number 2 (level 2) of the previous right hand corner section 3 (level 1).

Figure 7:
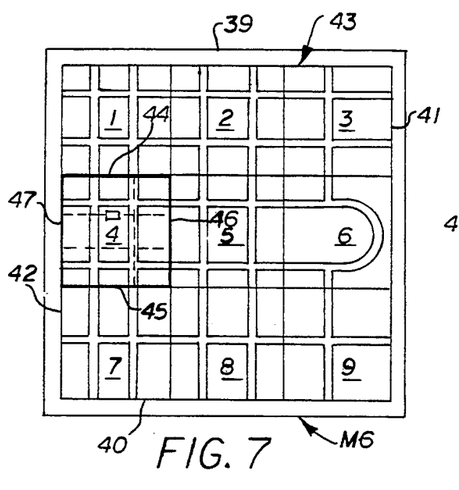

Referring additionally to FIG. 7, the lines which define each of the fifth level cells 1–9 then become the sides of a sixth level rectangular parallelogram having opposite parallel sides and 90° included angles. For example, the lines 39, 40, 41, and 42 become the opposed parallel sides of the sixth level rectangular parallelogram 43. The sixth level parallelogram 43 is divided by the same number of rows and columns as the previous parallelogram to define a series of cells, for example nine cells, and each individual cell is assigned a numeral 1–9 as before. Thus, each of the spaces 1–9 of the sixth level parallelogram 43 represents a particular section of the previous section of the previous section of the previous section of the previous section of the previous section. For example, the numeral 8 identifies the bottom center section of the previous center section number 5 (level 5) of the previous lower left hand section number 7 (level 4) of the previous right hand center section number 6 (level 3) of the previous top center section number 2 (level 2) of the previous right hand corner section 3 (level 1).

Figure 8:
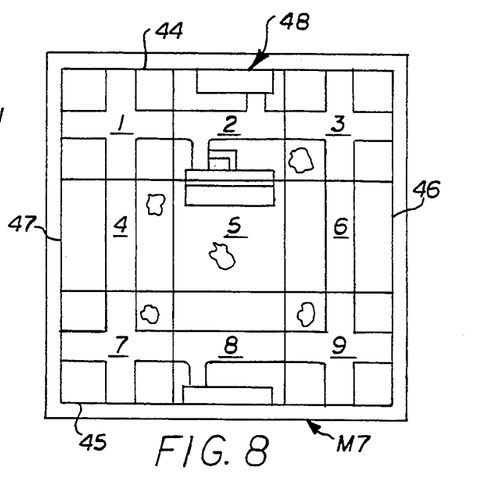

Referring additionally to FIG. 8, the lines which define each of the sixth level cells 1–9 then become the sides of a seventh level rectangular parallelogram having opposite parallel sides and 90° included angles. For example, the lines 44, 45, 46, and 47 become the opposed parallel sides of the seventh level rectangular parallelogram 48. The seventh level parallelogram 48 is divided by the same number of rows and columns as the previous parallelogram to define a series of cells, for example nine cells, and each individual cell is assigned a numeral 1–9 as before. Thus, each of the spaces 1–9 of the seventh level parallelogram 48 represents a particular section of the previous section of the previous section of the previous section of the previous section of the previous section of the previous section. For example, the numeral 4 identifies the left hand center section of the previous bottom center section number 8 (level 6) of the previous center section number 5 (level 5) of the previous lower left hand section number 7 (level 4) of the previous right hand center section number 6 (level 3) of the previous top center section number 2 (level 2) of the previous right hand corner section 3 (level 1).

The alphanumeric character set created by the above described method would result in a letter prefix followed by seven digits, or, as in the described example, "J3267584". Although seven digits have been described, it should be understood that the number of digits may vary depending upon the complexity of the starting entity or base geographical region and the desired precision of accuracy of the ending location.

For example, in the seven digit number "J3267584" if the parallelogram which circumscribes Jackson County "J" represents 81 miles square, then the first digit 3 (level 1) would identify the right hand corner section of Jackson County which would be 27 miles square, the second digit 2 (level 2) would identify the top center section of section 3 which would be 9 miles square, the third digit 6 (level 3) would identify the right hand center section of section 2 which would be 3 miles square, the fourth digit 7 (level 4) would identify the lower left hand section of section 6 which would be 1 mile square, the fifth digit 5 (level 5) would identify the center section of section 7 which would be 1,760 feet square, the sixth digit 8 (level 6) would identify the bottom center section of section 5 which would be 587 feet square, and finally, the seventh digit 4 (level 7) identifies the left hand center section of section 8 which would be 195 feet square. This system could be carried out even further to pinpoint a specific location within a few feet.

Referring again to FIG. 2, and continuing with the same example as above, a series of grids of maps are prepared corresponding to the above described numerical identification method. The first map M1 is a map of the base geographical region which is circumscribed by the parallelogram 10, for example, Jackson County. This first map may be identified by the prefix "J" or the name of the particular geographical region. The top, bottom, right, and left lines 11, 12, 13, and 14 intersect the outermost top, bottom, right, and left points 16, 17, and 18, respectively, of the boundary lines BL of the geographical region GR to define a rectangular parallelogram scaled to represent the distance between the outermost points of the region (Jackson County). In the example, for ease of understanding, the horizontal lines 11 and 12 represent 81 miles and the vertical lines 13 and 14 represent 81 miles. However, it should be understood that the horizontal distance and the vertical distance do not have to be the same. The parallelogram 10 is divided by an equal number or rows and columns to define a series of equal cells, for example nine cells, and each individual cell is assigned a numeral 1–9. Thus, each of the cells 1–9 represents a particular 27 mile square section of the circumscribed geographical region, and may be identified by the alphanumeric code "J1 through J9".

The horizontal and vertical lines which define each of the first level cells 1–9 then become the outer lines of a second series of maps M2 each corresponding to cells 1–9, respectively. The second series of maps M2 are preferably enlarged to the same size as M1 with the horizontal lines 19 and 20 representing 27 miles and the vertical lines 21 and 22 representing 27 miles (FIG. 3). Thus, the second series of maps M2 each represent a 27 mile square section of the previous map. The maps M2 may be identified by the alphanumeric code "J11 through J99".

The parallelogram 23 (map M2) formed by the lines 19, 20, 21, and 22 is divided by the same number of equal rows and columns as the previous parallelogram to define a series of adjacent cells and each individual cell is assigned a numeral 1–9 as before. The horizontal and vertical lines which define each of the second level cells 1–9 then become the outer lines of a third series of maps M3 each corresponding to cells 1–9, respectively. The third series of maps M3 are preferably enlarged to the same size as M1 with the horizontal lines 24 and 25 representing 9 miles and the vertical lines 26 and 27 representing 9 miles (FIG. 4). Thus, the third series of maps M3 each represent a 9 mile square section of the previous map M2. The maps M3 may be identified by the alphanumeric code "J111 through J999".

The parallelogram 28 (map M3) formed by the lines 24, 25, 26, and 27 is divided by the same number of equal rows and columns as the previous parallelogram to define a series of adjacent cells and each individual cell is assigned a numeral 1–9 as before. The horizontal and vertical lines which define each of the third level cells 1–9 then become the outer lines of a fourth series of maps M4 each corresponding to cells 1–9, respectively. The fourth series of maps M4 are preferably enlarged to the same size as M1 with the horizontal lines 29 and 30 representing 3 miles and the vertical lines 31 and 32 representing 3 miles (FIG. 5). Thus, the fourth series of maps M4 each represent a 3 mile square section of the previous map M3. The maps M4 may be identified by the alphanumeric code "J1111 through J9999".

The parallelogram 33 (map M4) formed by the lines 29, 30, 31, and 32 is divided by the same number of equal rows and columns as the previous parallelogram to define a series of adjacent cells and each individual cell is assigned a numeral 1–9 as before. The horizontal and vertical lines which define each of the fourth level cells 1–9 then become the outer lines of a fifth series of maps M5 each corresponding to cells 1–9, respectively. The fifth series of maps M5 are preferably enlarged to the same size as M1 with the horizontal lines 34 and 35 representing 1 mile and the vertical lines 36 and 37 representing 1 mile (FIG. 6). Thus, the fifth series of maps M5 each represent a 1 mile square section of the previous map M4. The maps M5 may be identified by the alphanumeric code "J11111 through J99999".

The parallelogram 38 (map M5) formed by the lines 34, 35, 36, and 37 is divided by the same number of equal rows and columns as the previous parallelogram to define a series of adjacent cells and each individual cell is assigned a numeral 1–9 as before. The horizontal and vertical lines which define each of the fifth level cells 1–9 then become the outer lines of a sixth series of maps M6 each corresponding to cells 1–9, respectively. The sixth series of maps M6 are preferably enlarged to the same size as M1 with the horizontal lines 39 and 40 representing 1,760 feet and the vertical lines 41 and 42 representing 1,760 feet (FIG. 7). Thus, the sixth series of maps M6 each represent a 1,760 foot square section of the previous map M5. The maps M6 may be identified by the alphanumeric code "J111111 through J999999".

The parallelogram 43 (map M6) formed by the lines 39, 40, 41, and 42 is divided by the same number of equal rows and columns as the previous parallelogram to define a series of adjacent cells and each individual cell is assigned a numeral 1-9 as before. The horizontal and vertical lines which define each of the sixth level cells 1-9 then become the outer lines of a seventh series of maps M7 each corresponding to cells 1-9, respectively. The seventh series of maps M7 are preferably enlarged to the same size as M1 with the horizontal lines 44 and 45 representing 587 feet and the vertical lines 46 and 47 representing 587 feet (FIG. 8). Thus, the seventh series of maps M7 each represent a 587 foot square section of the previous map M6. The maps M7 may be identified by the alphanumeric code "J1111111 through J9999999".

Thus, if a location were identified as "J3267584", the person attempting to find that location with the present system would be able to quickly retrieve a map corresponding to the alphanumeric code "J3267584" and would be able to view a specific 195 foot square section of Jackson County.

That specific 195 foot square section would be the left hand center section (4) of a 587 foot square section located in the bottom center section (8) of a 1,769 foot square section located in the center section (5) of a 1 mile square section located in the lower left hand section (7) of a 3 mile square section located in the right hand center section (6) of a 9 mile square section located in the top center section (2) of a 27 mile square section of the 81 mile square section of Jackson County (J3).

The system may also incorporate an alphanumeric suffix to indicate vertical positioning. For example, if the last circumscribed section of the geographical region is 195 feet square and is occupied by a five story office building, a letter suffix, such as "F", may be added to the character set to represent "floor" and followed by a numeral to represent a particular floor of that building. In other words, in the character set of "J3267584F3" the suffix "F3" would identify the 3rd floor of the building occupying the 195 foot square section of Jackson County identified as "J3267584".

Signs bearing the alphanumeric character set representing a particular section may be posted on various landmarks, such as buildings, storefronts, mailboxes, or telephone poles, in the respective section so that residents within a particular section would be familiar with the respective alphanumeric code, and those who are not familiar with the area or are just passing through the area may easily identify their location. Emergency personnel would be provided with the alphanumeric mapping system.

In an emergency situation, a person requesting help would use the alphanumeric character set to identify the location at which assistance is needed instead of, or in addition to, a street address or the name of a street and the nearest cross street (if known). The dispatcher would then relay the alphanumeric character set to the appropriate emergency personnel who would then be able to pinpoint the location by accessing the corresponding map, they would also be able to determine whether the location is in a rural area and other geographical data relative to that particular section to determine the best route to the emergency scene and the most appropriate vehicle and equipment needed to handle the situation. For example, the map of that section may show that there are no roads near the emergency scene, and they would know to dispatch a helicopter.

The present system can be used along with the "911" emergency dispatch system, or can be incorporated therewith wherein a person requesting help calls "911" on the telephone and a computer automatically displays the alphanumeric character set and/or street address from which the call was made.

The present system is also easily incorporated into a computerized system wherein the alphanumeric character set serves as the filename to store and retrieve a particular map of a section of a geographical region. The series of maps created by the method described above may be stored in memory and quickly retrieved and displayed by entering the alphanumeric character set on the keyboard.

While a preferred embodiment has been described which utilizes a letter, such as a "J" to identify the starting entity or base geographical region, the starting entity or base geographical region GR which is circumscribed by the parallelogram may also be identified by a prefix numeral. For example; states, counties or geographical regions, may be arranged alphabetically and then assigned a two digit identifier number, i.e., Alabama=01, Idaho=12, Texas=43. The two digit identifyer number is then followed by a "-" and then a three digit identifier for the region followed by another "-", and then a string of whole numbers to identify the geographical location within the region according to the method described previously. In this embodiment, the first two digits (01-99) would identify a state, the second three digit number (001-999) would identify a particular geographical region within the state such as a county or parish, and the third set of numbers would identify the specific location within the region.

For example, in the string "12-012-5721368-1155, the "12" is Idaho, the "012" is Jackson county, the "5721368" is a specific location within Jackson county, and the "1155" is the 11th floor and 55 is the center of the 11th floor.

While this invention has been described fully and completely with special emphasis upon a preferred embodiment, it should be understood that within the scope of the appended claims the invention may be practiced otherwise than as specifically described herein.

I claim:

1. A method of identifying and accurately locating a specific location within a geographical region comprising the steps of:

circumscribing a geographical region with a first rectangular parallelogram having 90° included angles, the four sides of said first parallelogram intersecting the outermost top, bottom, left, and right points of the geographical region and assigning at least one prefix to identify the circumscribed geographical region;

dividing said first parallelogram into an equal number of rows and columns to define a first series of adjacent smaller rectangular cells of equal size each circumscribing a section of said geographical region and assigning a different whole number from 1 to 9 to each said section representing its position relative to the others, and identifying each said section by the combination of said prefix followed by the whole number assigned to it;

dividing each said smaller rectangular cell into the same number of rows and columns used previously to define a second series of adjacent smaller rectangular cells of equal size each circumscribing a subsection of the previous section and assigning a different whole number from 1 to 9 to each said subsection representing its location relative to the others, and identifying each said subsection by said prefix followed in sequence by the whole number assigned to the previous section followed by the whole number assigned to said subsection;

repeating the steps of dividing each said smaller rectangular cell into the same number of rows and column used previously to define successive series of adjacent smaller rectangular cells of equal size each circumscribing successively smaller subsections of the previous subsection and at each step assigning a different whole number from 1 to 9 to each said successively smaller subsection representing its location relative to the others, and at each step identifying each said successively smaller subsection by said prefix followed in sequence by the whole number assigned to the previous said section followed by the whole number assigned to the previous said subsection followed by the whole number assigned to said successively smaller subsections; whereby each series of cells is identified by said prefix followed by one or more whole numbers, each said whole number identifying a particular section of said geographical region and the numerical value of each said whole number identifying the location of each particular section and subsection relative to the others; and the order in which each said whole number is disposed in said sequence corresponding to the size of the particular section identified by said whole number with the first said whole number in the sequence following said prefix corresponding to the largest section of said geographical region and the following said whole numbers corresponding to sequentially smaller subsections of said geographical region.

2. The method according to claim 1 in which the first said whole number in the sequence following said prefix corresponds to the largest section of said geographical region, the second said whole number in the sequence corresponds to a sequentially smaller subsection of the section identified by the first said whole number, and the following said whole numbers correspond to sequentially smaller subsections of the subsection identified by the preceding said whole number.

3. The method according to claim 1 including a suffix including a numeral following the last said whole number in said sequence to further identify a vertical position of a location identified by the previous whole number in said sequence.

4. The method according to claim 3 in which said prefix identifying the circumscribed geographical region and said suffix identifying the vertical position of a location are selected from the group of characters consisting of alphabetical and numerical characters.

5. A mapping system for identifying and accurately locating a specific location within a geographical region comprising:

a first map of a geographical region circumscribed by a first rectangular parallelogram having 90° included angles, the four sides of said first parallelogram intersecting the outermost top, bottom, left, and right points of the geographical region, said first map of said circumscribed geographical region identified by at least one prefix;

said first parallelogram divided into an equal number of rows and columns to define a first series of adjacent smaller rectangular cells of equal size each circumscribing a section of said geographical region and each said section identified by a different whole number from 1 to 9 to represent its position relative to the others, and each said section identified by the combination of said prefix followed by the whole number assigned to it;

a series of second maps of each said section circumscribed by said smaller rectangular cells and identified by the combination of said prefix followed by the whole number assigned to the respective said smaller rectangular cell;

each said smaller rectangular cell divided into the same number of rows and columns used previously to define a second series of adjacent smaller rectangular cells of equal size each circumscribing a subsection of the previous section and each said subsection identified by a different whole number from 1 to 9 to represent its location relative to the others, and each said subsection identified by said prefix followed in sequence by the whole number assigned to the previous said section followed by the whole number assigned to said subsection;

a series of third maps of each said subsection circumscribed by said smaller rectangular cells and identified by the combination of said prefix followed in sequence by the whole number assigned to the previous said section followed by the whole number assigned to the respective said subsection;

a plurality of series of subsequent maps each formed by dividing each said subsection into the same number of rows and columns used previously to define a successive series of adjacent smaller rectangular cells of equal size each circumscribing successively smaller subsections of the previous subsection and each successive series of adjacent smaller subsections identified by a different whole number from 1 to 9 to represent its location relative to the others, and each of said successively smaller subsection identified by said prefix followed in sequence by the whole number assigned to the previous said section followed by the whole number assigned to the previous said subsection followed by the whole number assigned to said each respective said successively smaller subsection; whereby each series of maps is identified by said prefix followed by one or more whole numbers, each said whole number identifying a particular section of said geographical region and the numerical value of each said whole number identifying the location of each particular section and subsection relative to the others; and the order in which each said whole number is disposed in said sequence corresponding to the size of the particular section identified by said whole number with the first said whole number in the sequence following said prefix corresponding to the largest section of said geographical region and the following said whole numbers corresponding to sequentially smaller subsections of said geographical region.

6. The mapping system according to claim 5 in which the first said whole number in the sequence following said prefix corresponds to the map of the largest section of said geographical region, the second said whole number in the sequence corresponds to a map of a sequentially smaller subsection of the section identified by the first said whole number, and the following said whole numbers correspond to maps of sequentially smaller subsections of the subsection identified by the preceding said whole number.

7. The mapping system according to claim 5 including a suffix including a numeral following the last said whole number in said sequence to further identify a vertical position of a location identified by the previous whole number in said sequence.

8. The mapping system according to claim 7 in which said prefix identifying the circumscribed geographical region and said suffix identifying the vertical position of a location are selected from the group of characters consisting of alphabetical and numerical characters.

* * * * *